United States Patent Office 3,193,388
Patented July 6, 1965

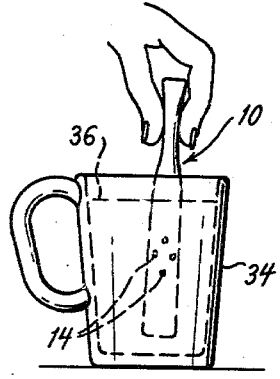
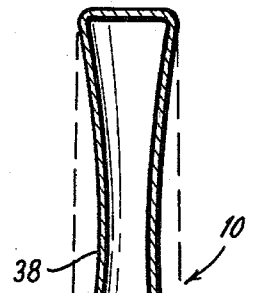
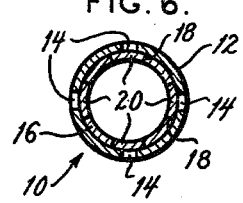
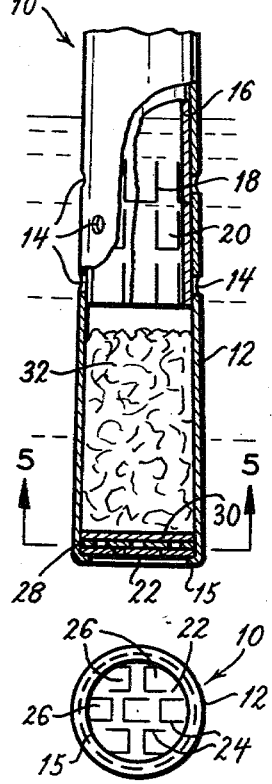
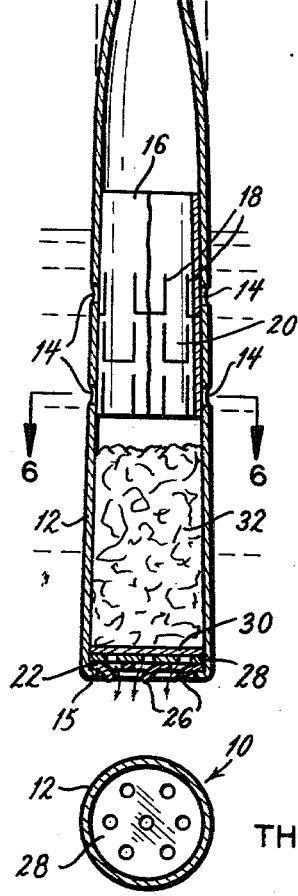
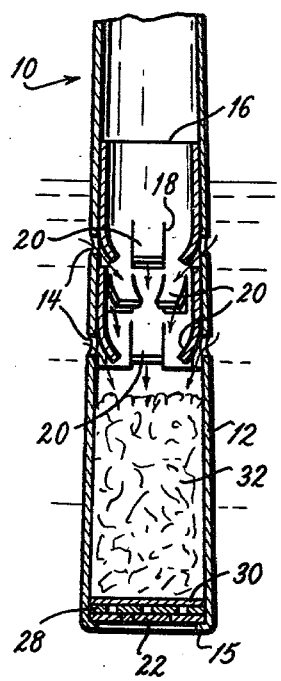

3,193,388
BREWING DEVICE FOR POTABLE LIQUIDS
Thurman Max Conrey, 232 S. Elm St., Centralia, Ill.
Filed July 5, 1963, Ser. No. 292,990
9 Claims. (Cl. 99—77.1)

This invention relates to improvements in brewing devices. More particularly, this invention relates to improvements in devices which can brew a cup of potable liquid.

It is, therefore, an object of the present invention to provide an improved device which can drew a cup of potable liquid.

It is frequently desirable to brew a cup of tea, coffee or other potable liquid; and, in recognition of that fact, a number of devices have been proposed to perform such brewing. Some devices, such as tea bags, require substantial periods of time to brew the potable liquids. Other devices, such as tea balls, are bulky; and tea balls are hard to clean. It would be desirable to provide a device which could promptly and effectively brew a cup of potable liquid, which was compact, and which could be discarded after it had been used. The present invention provides such a device; and it is, therefore, an object of the present invention to provide a device which can promptly and effectively brew a cup of potable liquid, which is compact, and which can be discarded after it has been used.

The present invention effects prompt brewing of a cup of potable liquid by positively forcing hot water through the tea, coffee or the like. Not only is the brewing effected quickly, but full utilization of the tea, coffee or the like also is effected. It is, therefore, an object of the present invention to provide a brewing device which positively forces hot water through the tea, coffee, or the like.

The brewing device provided by the present invention includes a housing in which tea, coffee or the like is held during shipment and storage; and that housing tends to protect that tea, coffee or the like. That housing has flapper valves incorporated within it; and those flapper valves respond to squeezing of that housing, after the lower end of that housing has been set within a cup of hot water, to cause hot water to be drawn into that housing, to be forced through the tea, coffee or the like, and then to be forced out of that housing. As a result, the housing provided by the present invention protects the tea, coffee or the like during storage and shipment, and then constitutes a brewing device which can positively force hot water through the tea, coffee or the like. It is, therefore, an object of the present invention to provide a brewing device which includes a housing in which tea, coffee or the like can be held for shipment and storage, and which has flapper valves that can force hot water through the tea, coffee or the like.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

In the drawing, FIG. 1 is an elevational view of a brewing device that is made in accordance with the principles and teachings of the present invention and of a cup in which tea, coffee or the like is being brewed, FIG. 2 is a partially broken-away, vertical section, on a larger scale, through the brewing device of FIG. 1, and it shows that brewing device as it is forcing hot water through the tea, coffee or the like, FIG. 3 is a partially broken-away, partially sectioned view, on the scale of FIG. 2, of the lower portion of the brewing device of FIG. 1, and it shows that device with all of the flapper valves thereof closed, FIG. 4 is a view, on the scale of FIG. 2, of the bottom of the brewing device of FIG. 1, FIG. 5 is a sectional view, on the scale of FIG. 2, through the brewing device of FIG. 1, and it is taken along the plane indicated by the line 5—5 in FIG. 3, FIG. 6 is a sectional view, on the scale of FIG. 2, through the brewing device of FIG. 1, and it is taken along the plane indicated by the line 6—6 in FIG. 2, and FIG. 7 is a sectional view, on the scale of FIG. 2, through the lower portion of the brewing device of FIG. 1, and it shows that device as it is drawing hot water into the interior thereof.

Referring to the drawing in detail, the numeral 10 generally denotes a brewing device that is made in accordance with the principles and teachings of the present invention. That device includes an elongated hollow casing 12 which preferably will be made of an inexpensive material such as paper or the like. That casing is frusto-conical in elevation; and the upper portion thereof has a slightly smaller cross section than does the lower portion thereof. A number of openings 14 are formed in the wall of the casing 12; and those openings are spaced from the bottom of that casing a distance less than the height of a normal cup or mug. A flange 15 is provided at the lower end of the casing 12; and that flange extends inwardly from that lower end.

A short, tubular sleeve 16 is disposed within the casing 12. That sleeve will preferably be formed from an inexpensive material such as paper or the like; and that sleeve will be frusto-conical in elevation. The outer surface of the sleeve 16 will closely abut the inner surface of the casing 12. A number of U-shaped cuts 18 are provided in the wall of the sleeve 16; and those cuts define a number of flapper valves 20. Those flapper valves will be in register with the openings 14 in the casing 12. The normal positions of the flapper valves 20 are immediately adjacent the inner surface of the casing 12; and hence those flapper valves normally close the openings 14. Consequently, the sleeve 16, the flapper valves 20 thereof, and the casing 12 normally resist the entry or exit of dirt, dust or other foreign matter through the openings 14.

The numeral 22 denotes a circular disc which is held within the lower end of the housing 12 by the flange 15. That disc has a number of U-shaped cuts 24 therein; and those cuts define flapper valves 26. The disc 22 preferably will be made from some inexpensive material such as paper or the like. The normal positions of the flapper valves 26 are shown in FIG. 3; and, in those positions, those flapper valves will abut the under face of a circular perforated disc 28. That perforated disc overlies the disc 22; and the openings in the disc 28 will normally be underlain and closed by the flapper valves 26 of the disc 22. The disc 28 will preferably be made from an inexpensive material such as paper or the like.

The numeral 30 denotes a circular disc; and that disc preferably will be made of filter paper of the type which is customarily used in the brewing of tea, coffee or the like. That disc overlies the disc 28; and the discs 22, 28 and 30 will coact to constitute a closure for the bottom of the casing 12.

The tea, coffee or the like which is to be brewed is denoted by the numeral 32; and it will rest upon and be confined by the disc 30. The pores of the disc 30 are so small that the tea, coffee or the like cannot pass through them; and hence the disc 30, the disc 28 and the disc 22 prevent loss of the tea, coffee or the like 32 through the bottom of the casing 12.

In making the brewing device 10 provided by the present invention, the casing 12 can be formed; and then the sleeve 16 can be telescoped within that casing. Alternatively, the sleeve 16 can be secured to the casing 12 while both that sleeve and casing are in developed form, and then that sleeve and casing can be rolled into frusto-conical form. The upper end of the casing 12 will be suitably closed; and thereafter the tea, coffee or the like 32 will be introduced into that casing through the open bottom thereof. At such time, the discs 30, 28 and 22 will be telescoped into the open bottom of that casing, and then the flange 15 will be formed. The completed brewing device 10 will be neat, compact, and easily handled.

To use the brewing device 10 in brewing a cup of potable liquid, the upper end of the casing 12 is grasped and used to hold the lower end of the brewing device in hot water 36 within a cup or mug 34. Thereafter, the upper portion of the casing 12 will be bent at the point 38 to assume the deformed configuration shown by solid lines in FIG. 2; and then the pressure on that upper portion will be released. As that pressure is released, the upper portion of the casing 12 will resume the configuration indicated by dotted lines in FIG. 2.

As the upper portion of the casing 12 is deformed, at the point 38, air will be forced downwardly and out through the discs 30 and 28 and past the flapper valves 26 of the disc 22. When the deforming pressure on the casing 12 is released, and the upper portion of that casing resumes the normal configuration indicated by the dotted lines in FIG. 2, a reduced pressure will be created within the casing 12. The flapper valves 20 will bend inwardly in response to that reduced pressure, and hot water 36 will move inwardly through the openings 14 in response to that reduced pressure. That hot water will then fall downwardly onto the tea, coffee or the like 32 within the casing 12.

A further deformation of the upper portion of the casing 12 will cause hot water to move downwardly through the tea, coffee or the like 32, through the disc 30, through the openings in the disc 28, and then out past the flapper valves 26 of the disc 22. When the deforming pressure on the upper portion of the casing 12 is again released, the flapper valves 26 will resume the positions shown in FIG. 3 and the flapper valves 20 will move to the positions shown by FIG. 7. At such time, further hot water will pass inwardly through the openings 14 and downwardly onto the tea, coffee or the like 32.

A still further deformation of the upper portion of the casing 12 will cause the flapper valves 20 to resume the positions shown by FIGS. 2 and 3, and will cause the flapper valves 26 to assume the positions shown by FIG. 2. As a result, further hot water will pass downwardly through the tea, coffee or the like 32 and out through the openings in the disc 28.

The overall result is that within a very short time, sufficient hot water will have been forced through the tea, coffee or the like 32 to effect the desired brewing of the potable liquid. Once that has been done, the brewing device 10 can be removed from the mug 34 and discarded.

It will be noted that throughout the brewing of the potable liquid, the user's fingers did not come close to the hot water. Further, it will be noted that a positive, although intermittent, flow of hot water was provided through the tea, coffee or the like 32. As a result, full utilization of the tea, coffee or the like 32 is attained without any danger of the fingers of the user being scalded.

Whereas the drawing and accompanying description have shown and described a preferred embodiment of the present invention, it should be apparent to those skilled in the art that various changes may be made in the form of the invention without affecting the scope thereof.

What I claim is:

1. A device for use in brewing a cup of potable liquid and which comprises:
   (a) a casing and a plurality of particles of ingredients used in brewing a potable liquid confined within the casing,
   (b) said casing being elongated and flexible,
   (c) said casing being tapered with the upper end thereof smaller than the lower end thereof,
   (d) said upper end of said casing being closed,
   (e) said casing being made of paper so said device can be discarded after it has been used,
   (f) openings in the side walls of said casing to permit hot water to enter said casing and to flow past and mix with said ingredients to brew said potable liquid,
   (g) a disc disposed in the bottom of said casing that has openings therein to permit said potable liquid to exit from said casing,
   (h) a disc of filter paper that overlies the first said disc,
   (i) a sleeve within said casing adjacent said openings in said side walls of said casing,
   (j) flapper valves in said sleeve that normally close said openings in said side walls of said casing,
   (k) said flapper valves responding to a reduced pressure in said casing to open said openings in said side walls of said casing,
   (l) further flapper valves that normally close said openings in said first disc,
   (m) said further flapper valves responding to an increased pressure in said casing to open said openings in said first disc, and
   (n) a portion of said casing that is flexible and resilient and that responds to external forces to flex inwardly and create an increased pressure in said casing, thereby causing said further flapper valves to open said openings in said first disc,
   (o) said portion of said casing subsequently responding to relaxation of said external forces to resume its normal condition and thereby create a reduced pressure in said casing, thereby causing the first said flapper valves to open said openings in said side walls of said casing,
   (p) said portion of said casing being intermediate said upper end of said casing and said openings in said side walls of said casing,
   (q) said casing defining a space, intermediate said disc and said openings in said side walls of said casing, for said ingredients,
   (r) said device responding to flexing and releasing of said portion of said casing to draw hot water inwardly through said openings in said side walls of said casing, to brew said potable liquid, and to force said potable liquid outwardly through said openings in said disc.

2. A device for use in brewing a cup of potable liquid and which comprises:
   (a) a casing and a plurality of particles of ingredients used in brewing a potable liquid confined within the casing,
   (b) said casing being elongated and flexible,
   (c) said casing having a closed upper end,
   (d) openings in the side walls of said casing to permit hot water to enter said casing and to flow past and mix with said ingredients to brew said potable liquid,
   (e) openings adjacent the bottom of said casing to permit said potable liquid to exit from said casing,
   (f) a sleeve within said casing adjacent said openings in said side walls of said casing,
   (g) flapper valves in said sleeve that normally close said openings in said side walls of said casing,
   (h) said flapper valves responding to a reduced pressure in said casing to open said openings in said side walls of said casing,
   (i) further flapper valves that normally close said openings adjacent the bottom of said casing,
   (j) said further flapper valves responding to an increased pressure in said casing to open said openings adjacent the bottom of said casing, and (k) a portion of said casing that is flexible and resilient and that responds to external forces to flex inwardly and create an increased pressure in said casing, thereby causing said further flapper valves to open said openings adjacent the bottom of said casing, (l) said portion of said casing subsequently responding to relaxation of said external forces to resume its normal condition and thereby create a reduced pressure in said casing, (m) said portion of said casing being intermediate said upper end of said casing and said openings in said side walls of said casing, (n) said device responding to flexing and releasing of said portion of said casing to draw hot water inwardly through said openings in said side walls of said casing, to brew said potable liquid, and to force said potable liquid outwardly through said openings adjacent the bottom of said casing.

3. A device for use in brewing a cup of potable liquid and which comprises:

(a) a casing and a plurality of particles of ingredients used in brewing a potable liquid confined within the casing, (b) said casing having a closed upper end and flexible, (c) openings in the side walls of said casing to permit hot water to enter said casing and to flow past and mix with said ingredients to brew said potable liquid, (d) openings adjacent the bottom of said casing to permit said potable liquid to exit from said casing, (e) flapper valves in said casing that normally close said openings in said side walls of said casing, (f) said flapper valves responding to a reduced pressure in said casing to open said openings in said side walls of said casing, (g) further flapper valves that normally close said openings adjacent the bottom of said casing, (h) said further flapper valves responding to an increased pressure in said casing to open said openings adjacent the bottom of said casing, and (i) a portion of said casing that is flexible and resilient and that responds to external forces to flex inwardly and create an increased pressure in said casing, thereby causing said further flapper valves to open said openings adjacent the bottom of said casing, (j) said portion of said casing subsequently responding to relaxation of said external forces to resume its normal condition and thereby create a reduced pressure in said casing, (k) said portion of said casing being intermediate said upper end of said casing and said openings in said side walls of said casing, (l) said casing defining a space, intermediate said bottom and said openings in said side walls of said casing, for said ingredients.

4. A device for use in brewing a cup of potable liquid and which comprises:

(a) a casing and a plurality of particles of ingredients used in brewing a potable liquid confined within the casing, (b) openings in said casing to permit hot water to enter said casing and to flow past and contact said ingredients to brew said potable liquid; the casing being flexible, (c) further openings in said casing to permit said potable liquid to exit from said casing, (d) valves in said casing that normally close the first said openings in said casing, (e) further valves in said casing that normally close said further openings in said casing, and (f) a portion of said casing that is flexible and resilient and that responds to external forces to flex and cause said further valves to open, (g) said portion of said casing subsequently responding to relaxation of said external forces to resume its normal condition and cause the first said valves to open, (h) said device responding to flexing and releasing of said portion of said casing to draw hot water inwardly through the first said openings, to brew said potable liquid, and to force said potable liquid outwardly through said further openings.

5. A device for use in brewing a cup of potable liquid and which comprises:

(a) a casing and a plurality of particles of ingredients used in brewing a potable liquid confined within the casing, (b) openings in the side walls of said casing to permit hot water to enter said casing and to flow past and mix with said ingredients to brew said potable liquid; the casing being flexible, (c) openings adjacent the bottom of said casing to permit said potable liquid to exit from said casing, (d) flapper valves in said casing that normally close said openings in said side walls of said casing, (e) said flapper valves responding to a reduced pressure in said casing to open said openings in said side walls of said casing, (f) further flapper valves that normally close said openings adjacent the bottom of said casing, (g) said further flapper valves responding to an increased pressure in said casing to open said openings adjacent the bottom of said casing, and (h) a portion of said casing that is flexible and resilient and that responds to external forces to flex inwardly and create an increased pressure in said casing, thereby causing said further flapper valves to open said openings adjacent the bottom of said casing, (i) said portion of said casing subsequently responding to relaxation of said external forces to resume its normal condition and thereby create a reduced pressure in said casing, thereby causing the first said flapper valves to open said openings in said side walls of said casing.

6. A device for use in brewing a cup of potable liquid and which comprises:

(a) a casing and a plurality of particles of ingredients used in brewing a potable liquid confined within the casing, (b) openings in said casing to permit hot water to enter said casing and to flow past and contact said ingredients to brew said potable liquid; the casing being flexible, (c) further openings in said casing to permit said potable liquid to exit from said casing, (d) valves in said casing that normally close the first said openings in said casing, (e) further valves in said casing that normally close said further openings in said casing, and (f) a portion of said casing that is flexible and resilient and that responds to external forces to flex and cause said further valves to open, (g) said portion of said casing subsequently responding to relaxation of said external forces to resume its normal condition and cause the first said valves to open, (h) said device responding to flexing and releasing of said portion of said casing to draw hot water inwardly through the first said openings, to brew said potable liquid, and to force said potable liquid outwardly through said further openings, (i) said casing defining a space, intermediate the first said and said further openings for said ingredients.

7. A device for immersion into a container of water to brew a potable liquid comprising (a) a casing having a hollow interior, (b) a plurality of particles of brewing ingredients within the hollow interior of the casing, (c) a plurality of openings through the casing opening to the hollow interior to permit water to pass into and out of the casing, (d) all of the openings being positioned on the casing to they will be beneath the surface of water in the container when the casing is dipped into the water, (e) and flexible means comprising an extension of the casing for alternately pumping water into and out of the casing upon alternately squeezing and releasing the flexible means, the flexible means being imperforate, (f) and a one-way valve covering each opening for admitting water through the second group of openings upon releasing the flexible means and blocking the flow of water therethrough upon squeezing the flexible means.

8. The device of claim 7 wherein
(a) the openings being in two groups,
(b) one of the groups being located generally toward one side of the brewing ingredients and the other of the groups being located generally toward another side of the brewing ingredients,
(c) and the brewing ingredients being generally between the two said groups of openings.

9. The device of claim 7 wherein the openings are in two groups, one of the groups being adjacent the bottom of the casing, the other group being in the side walls of the casing.

References Cited by the Examiner
UNITED STATES PATENTS

| | | | |
|---|---|---|---|
| 790,626 | 5/05 | French | 99—77.1 |
| 1,209,485 | 12/61 | Peal | 99—77.1 |
| 2,123,054 | 7/38 | Lamb et al. | 99—77.1 |
| 2,193,974 | 3/40 | Luckhaupt | 99—77.1 |
| 2,291,060 | 7/42 | Schiess | 99—77.1 |

A. LOUIS MONACELL, *Primary Examiner.*

RAYMOND N. JONES, *Examiner.*